(12) United States Patent
Uselli

(10) Patent No.: US 6,794,768 B2
(45) Date of Patent: Sep. 21, 2004

(54) DEVICE COMPRISING A STEERING LOCK AND AN IGNITION STARTER SWITCH WHICH CAN BE CONTROLLED BY A HANDLE IN THE PRESENCE OF AN IDENTIFICATION TRANSMITTER

(75) Inventor: Gianni Uselli, Velbert (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 0 days.

(21) Appl. No.: 10/381,244

(22) PCT Filed: Nov. 3, 2001

(86) PCT No.: PCT/EP01/12765
§ 371 (c)(1),
(2), (4) Date: Mar. 21, 2003

(87) PCT Pub. No.: WO02/38424
PCT Pub. Date: May 16, 2002

(65) Prior Publication Data
US 2004/0012262 A1 Jan. 22, 2004

(30) Foreign Application Priority Data
Oct. 8, 2000 (DE) .......................................... 10055361

(51) Int. Cl.[7] .............................................. B60R 25/04
(52) U.S. Cl. ...................................... 307/10.5
(58) Field of Search .................. 307/9.1, 10.1, 307/10.2, 10.3, 10.5, 10.6; 180/287; 340/425.5, 426.11, 426.12; 70/252

(56) References Cited

U.S. PATENT DOCUMENTS

| 5,036,687 A | * | 8/1991 | Takeuchi et al. ............... 70/186 |
| 5,656,867 A | * | 8/1997 | Kokubu ...................... 307/10.5 |
| 6,548,915 B1 | * | 4/2003 | Geber et al. ................ 307/10.2 |
| 6,573,615 B1 | * | 6/2003 | Asakura et al. .............. 307/9.1 |

FOREIGN PATENT DOCUMENTS

| DE | 3344411 | 6/1985 |
| DE | 3724705 | 5/1988 |
| DE | 198 38 992 A1 | 3/2000 |
| EP | 0742127 | 11/1996 |

* cited by examiner

Primary Examiner—Gregory J. Toatley, Jr.
(74) Attorney, Agent, or Firm—Friedrich Kueffner

(57) ABSTRACT

A device with a steering lock and an ignition starter switch which can be controlled by a handle in the presence of an identification transmitter is controlled by an ID transmitter which can be scanned by an ID receiver located in a vehicle. A control of the device includes a rotor which is constructed in part of magnetizable material. The rotor is connected to a handle in a rotationally fixed but axially mobile manner. In an axial starting position, the handle is blocked, but if the ID scanning is successful, an electromagnet is activated in order to move the rotor into an axial intermediate position. The handle can then be turned and the rotor is moved into an axial end position. The electromagnet is cut off, but a permanent magnet is activated to immobilize the motor.

12 Claims, 6 Drawing Sheets

DEVICE COMPRISING A STEERING LOCK AND AN IGNITION STARTER SWITCH WHICH CAN BE CONTROLLED BY A HANDLE IN THE PRESENCE OF AN IDENTIFICATION TRANSMITTER

BACKGROUND OF THE INVENTION

1. Field of the Invention

The invention pertains to a device with a steering lock and an ogmition starter switch which can be controlled by a handle in the presence of an identification transmitter.

2. Description of the Related Art

Although the steering mechanism of the switch can be controlled by the rotation of a nondetachable handle, this control can be executed only after an identification receiver (ID receiver) in the vehicle has verified the presence of an identification transmitter (ID transmitter). This verification is accomplished by the initiation of an identification scan (ID scan). Otherwise, in the absence of an ID transmitter, the handle is blocked and cannot be turned by hand. This type of control is called "passive go" or "keyless go". The ID transmitter consists of, for example, a card, which is carried by the authorized user of the vehicle. An ID transmitter of this type could also be integrated into an electronic key or into a cell phone.

Control means, which include a cam, are connected to the handle so that it can be blocked or released. After the handle has been actuated, the control means are returned by a restoring spring to a defined axial starting position. The cam has the job of properly coordinating the axial and rotational movement of the control means.

The known device of this type (DE 198 38 992 A1) requires a great deal of technical effort. Conventional steering locks and ignition switches cannot be used. The steering is locked electronically. The handle must execute not only a rotational movement but also certain axial movements in coordination with the rotation in order to move the electronic steering lock into the locking and release positions. This is cumbersome.

SUMMARY OF THE INVENTION

The invention is based on the task of developing a simple and yet reliable device of the type indicated above in which conventional steering locks and ignition starter switches can be used.

In accordance with the present invention, the device with a steering lock and an ignition starter switch which can be controlled by a handle in the presence of an identification transmitter is controlled by an ID transmitter which can be scanned by an ID receiver located in a vehicle. A control of the device includes a rotor which is constructed in part of magnetizable material. The rotor is connected to a handle in a rotationally fixed but axially mobile manner. In an axial starting position, the handle is blocked, but if the ID scanning is successful, an electromagnet is activated in order to move the rotor into an axial intermediate position. The handle can then be turned and the rotor is moved into an axial end position. The electromagnet is cut off, but a permanent magnet is activated to immobilize the motor. The steering mechanism is then released by the rotor output, and the handle can be turned in a reverse manner. First, the axial end position of the rotor is maintained and then the release position of the steering mechanism is maintained.

Because the control means in the invention consist of a rotor with at least certain areas of a material which can be magnetized, the rotor can be controlled axially by an electromagnet and held in its axial end position by a permanent magnet. In the axial starting position, the rotor is blocked, and therefore any attempt to turn the handle will fail. In this position, the rotor is also sufficiently far away in the axial direction from the permanent magnet, so that the permanent magnet does not yet have any effect on the rotor. If the ID scan is successful, current is supplied to the electromagnet, as a result of which the magnet pushes the rotor to an intermediate axial position against the force of the restoring spring acting on it. This lifts the blockade, and it is now possible to turn the handle. During this rotation of the handle, a slanted intermediate section of the cam is able to interact with the rotor. The turning of the handle, therefore, causes the rotor to arrive in an axial end position, in which the permanent magnet is now able to hold it, even after the current to the electromagnet has been turned off. The rotor can now be turned even farther, as a result of which a position in reached in which the steering mechanism is unlocked, and, in correspondence with the degree of rotation, the various other working positions of the switch are reached one after the other. This axial end position, however, remains preserved even after the rotor has been turned back in the opposite direction. During this reverse rotation, the rotor disengages from the cam and can be moved back to the home position of the switch, but the steering mechanism remains at first in its unlocked position. This does not change until after a sufficiently strong axial opposing force is exerted on the rotor, that is, strong enough to overcome the holding force of the permanent magnet and to move the rotor back into its axial starting position. Then the steering mechanism is moved into its locking position, and the rotor comes back into contact with the cam, which has the effect of preventing the handle from being turned. This interaction between the electromagnet and the permanent magnet can be executed reliably. The invention makes it possible to use conventional steering locks and ignition starter switches, which can be controlled by mechanical rotations or axial movements of the rotor output end.

Additional measures and advantages of the invention can be derived from the subclaims, from the following description, and from the drawings. The drawings present the invention schematically on the basis of an exemplary embodiment. The figures marked "a" show all the important components in axial cross section in different operating positions, whereas the figures marked "b" show a plan view of only a part of the device with the housing cut in the axial direction:

BRIEF DESCRIPTION OF THE DRAWING

FIGS. 5a and 5b show a fourth phase of operation, which results thereafter, the switch being in the same home position as that of the operating phase of FIG. 4a, but where the conditions have already been created for the return to the starting position, as illustrated by the home position of FIG. 1a.

DETAILED DESCRIPTION OF THE INVENTION

Figures 1A, 1B:
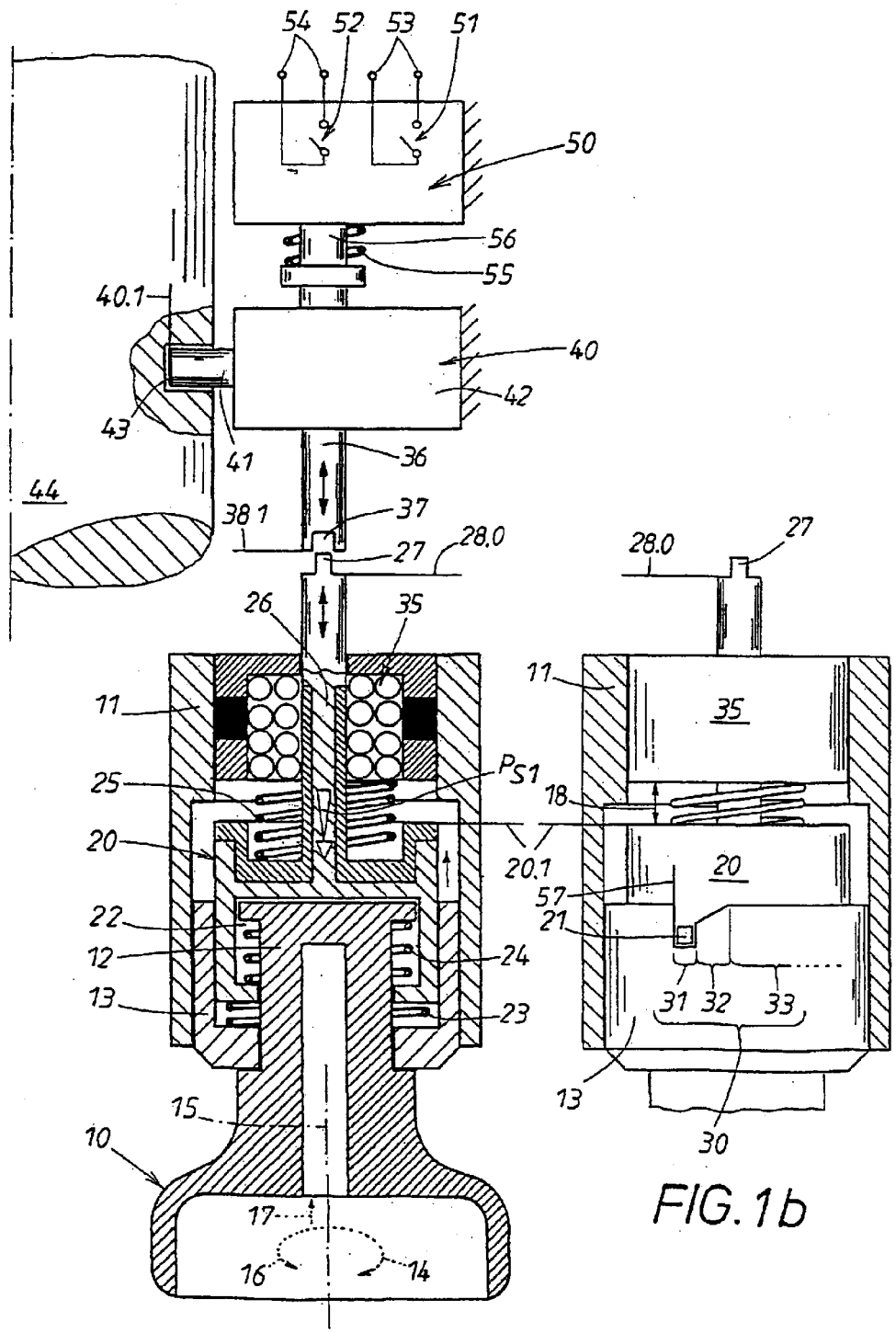
FIGS. 1a and 1b show the home position of the device according to the invention, in which the steering mechanism is in the locked position and the switch is in its home position, but in which the handle cannot be turned.

As previously mentioned, only the most essential components of the invention are illustrated schematically in the drawings. The device comprises a handle 10 in a housing 11, the handle being connected to a rotor 20 by two mutually engaging connector parts 12, 22 in such a way that the handle cannot turn, but can move in the axial direction with respect to the rotor 20. A sleeve-like stator 13, which occupies a permanent position in the housing 11, serves to guide the rotation of the rotor 20. The connection is established by a shaft 12 with a noncircular profile on the handle 10. This shaft engages in a receptacle 22 in the rotor, which has a corresponding noncircular shape. Compression springs 23, 24, 25 are provided between axial shoulders of the stator 13 and the rotor 20, between the shoulders of the stator 13 and the handle 10, and between the shoulders of the rotor 20 and the housing 11. These springs act additively on the rotor 20 to keep it in the axial starting position shown in FIGS. 1a and 1b. This starting position is marked by an auxiliary line designated 20.1.

As can be seen from FIG. 1b, the stator 13 carries a cam 30, which can be divided into three different sections 31–33. The rotor 20 interacts with this cam 30. This is done in the present case by means of a radial pin 31, projecting beyond the circumferential surface of the rotor 20. In the home position according to FIGS. 1a and 1b of the device, the pin 21 engages positively in a starting section 31 of the cam 30, which is designed here as an axial slit in the sleeve-like stator 13. The previously mentioned starting position 20.1 of the rotor 20 is, as illustrated in FIG. 1b, determined by the axial end stop created between the pin 21 and the axial end of the groove comprising the starting section 31 of the cam 30. The previously mentioned compression springs 23–25 exert an additive restoring force, marked by the force arrow $P_{S1}$, on the rotor 20.

As a result of the positive engagement at 21, 31, the handle 10 cannot be turned in the opposite direction either, this direction being indicated by the arrow 16. In addition, axial shoulders, one on the stator 13, the other on the handle 10, ensure that the handle cannot be pushed inward in the axial direction as indicated by the arrow 17. The rotor 20 is equipped with an axial shaft 26, which provides the rotor 20 with an output end 27, which can be used to establish another connection. A countershaft 36, which has an opposing connecting end 37 complementary to the rotor output end 27, is thus aligned with the axis 15 of the device. In the starting position 20.1 of the rotor mentioned above, the connecting ends 27, 37 are disengaged.

The countershaft 36 is rotatably connected at one end to an actuator 42 and a steering lock 40 and at the other end to the selector shaft 56 of an ignition starter switch 50. The two components 40, 50 can be of conventional design, for which reason it is sufficient to describe their internal construction merely in terms of the effects which they are known to produce. The actuator 42 of the steering lock 40 controls a locking element, which, in the present case consists of a longitudinally movable locking bolt 41. When in the home position of FIG. 1a, the locking bolt 41 is in the locking position, which is characterized by the auxiliary line 40.1. In this locking position 40.1, the locking bolt 41 engages in a rotation-proof locking opening 43 in the steering column 44. As a result, it is impossible to steer the vehicle.

In the present case, the countershaft 36 passes through the actuator 42 of the steering lock 40 and is always nonrotatably connected to the selector shaft 56. The selector shaft 56 ensures that the movable contacts of the component switches 51, 52, indicated here only schematically by way of example, are actuated in certain rotational positions of the shaft. It is advisable to provide torsion springs, which, when the countershaft 36 is disengaged, cause the selector shaft 56 to return to its starting rotational position, in which the two schematically indicated component switches 51, 52 are open. A compression spring 55 can be provided to exert an axial restoring force on the countershaft 36 and the selector shaft 56. In the home position, therefore, end stops (not shown) hold the countershaft 36 in the axial position 38.1, indicated by an auxiliary line. The previously mentioned starting position 20.1 of the rotor 20 defines the axially disengaged position of the rotor output end 27, indicated by the corresponding auxiliary line 28.0 in FIG. 1a.

As already mentioned above, the device according to the invention can be actuated by an ID transmitter (not shown). This ID transmitter consists, for example, of a credit card with data stored thereon, which the person authorized to operate the vehicle carries on his/her person. The vehicle itself contains an ID receiver, which can communicate with the ID transmitter when the credit card is brought close enough to the vehicle. This communication advisably does not begin until a consciously intended ID scan begins. This ID scan is initiated by a specific action of the authorized person. One possibility for this consists in the actuation of an electric switch. This switch which triggers the ID scan can be integrated into the handle which is used to operate a door. This action is therefore one of the actions which the person normally performs when entering the vehicle or while in the vehicle.

Figures 2A, 2B:
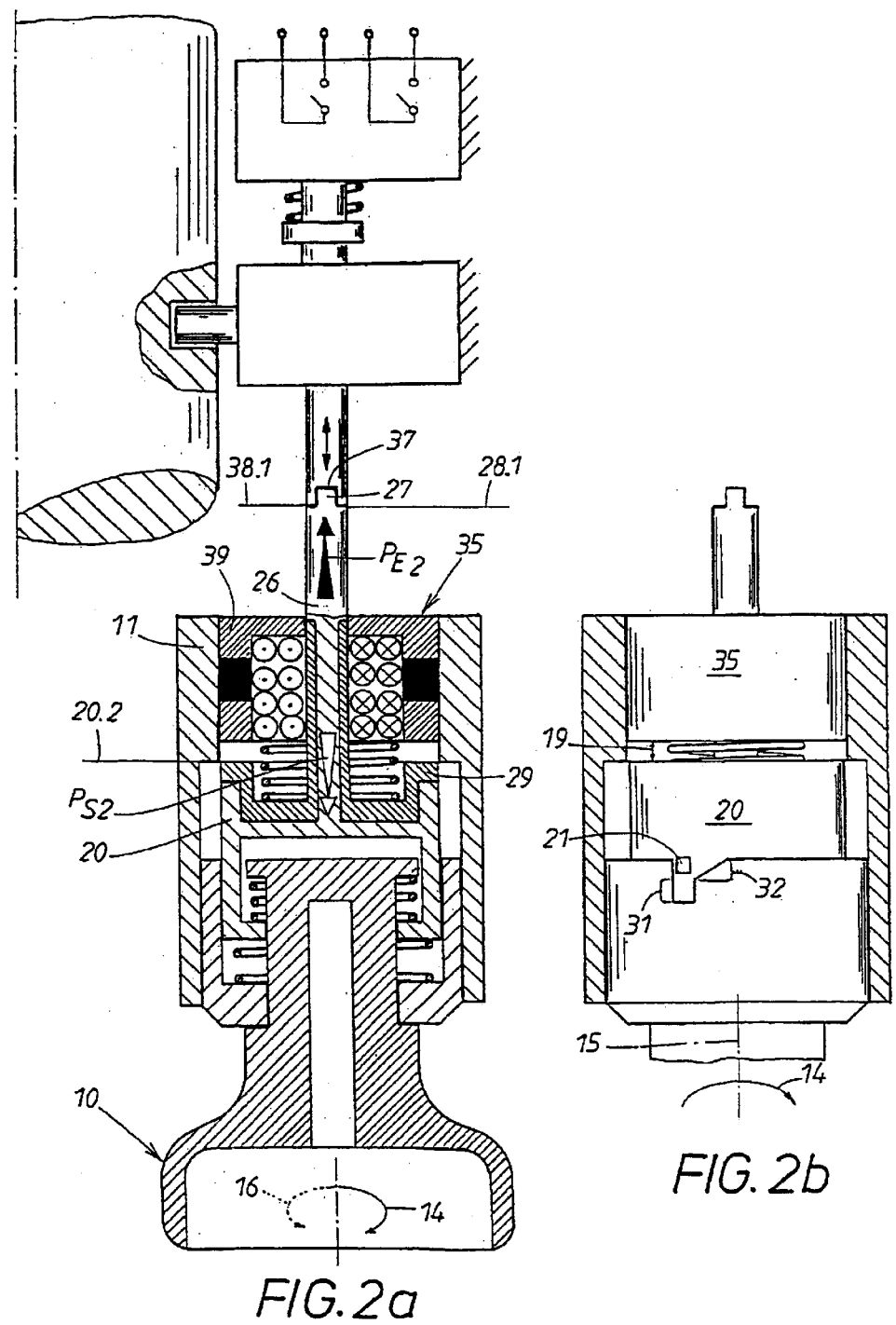
FIGS. 2a and 2b show a first phase of the operation of the device, where the steering mechanism and the switch are in the same positions and orientations as in FIGS. 1a and 1b, but the handle can now be turned.

The ID scan can lead to a simple result. If the wrong ID transmitter is present, communication with the ID receiver in the vehicle fails, and the handle 10 remains blocked as indicated in FIG. 1a. But if the ID transmitter is correct, communication is successful, and an electromagnet 35 is supplied with current, as shown in FIG. 2a.

The electromagnet sits in the inner end of the housing 11 and is separated from the rotor 20 by a well-defined axial distance 18, as shown in FIG. 1b. The electromagnet 35 is indicated schematically by the turns of an electric coil, which are not provided with current in the home position of FIG. 1a. But when current is supplied to the electromagnet 35 according to FIG. 2a, a magnetic force is produced, which acts on the rotor 20, as indicated by the force arrow $P_{E2}$. This happens because, as indicated in FIG. 2a, the electromagnet 35 has a sheath of magnetically conductive material 39, which cooperates with areas 29 of magnetizable material in the rotor 20. These areas 29 consist of a covering around a certain section of the previously mentioned rotor shaft 26 and of a disk covering the inner end of the rotor 20, the disk being provided here with an axial profile. This magnetic force $P_{E2}$ acts in opposition to the previously mentioned restoring force of the springs 23–25. These forces are coordinated with each other in such a way that, when current is supplied in FIG. 2a, the rotor 20 arrives in its axially shifted position, illustrated by the auxiliary line 20.2 in FIG. 2a, this position being referred to below as the "intermediate position" for reasons which will become clear later on. In this intermediate position 20.2, therefore, the additive elastic restoring force $P_{S2}$ indicated in FIG. 2a is in equilibrium with the magnetic force $P_{E2}$, and a reduced axial gap 19 according to FIG. 2b remains between the rotor 20 and the electromagnet 35.

In the intermediate position 20.2, the pin 21 on the rotor 20 has emerged from the groove-like starting section 31 of the cam 30 and has become aligned with the next section 32 of the cam, namely, an intermediate section 32 extending at an angle to the axis 15 of the rotor. Although the pin 21 has emerged from the groove, it is still supported against the left flank, opposite the slanted intermediate section 32. As a result, the handle 10 can be turned only in the direction of the rotation arrow 14. Rotation in the other direction as indicated by the opposite rotation arrow 16, however, is still prevented. When the rotor 20 is turned in direction 14, it is guided rotationally by its pin 21 along section 32, but it is also shifted axially into the end position 20.3 shown in FIGS. 3a and 3b.

Figures 3A, 3B:
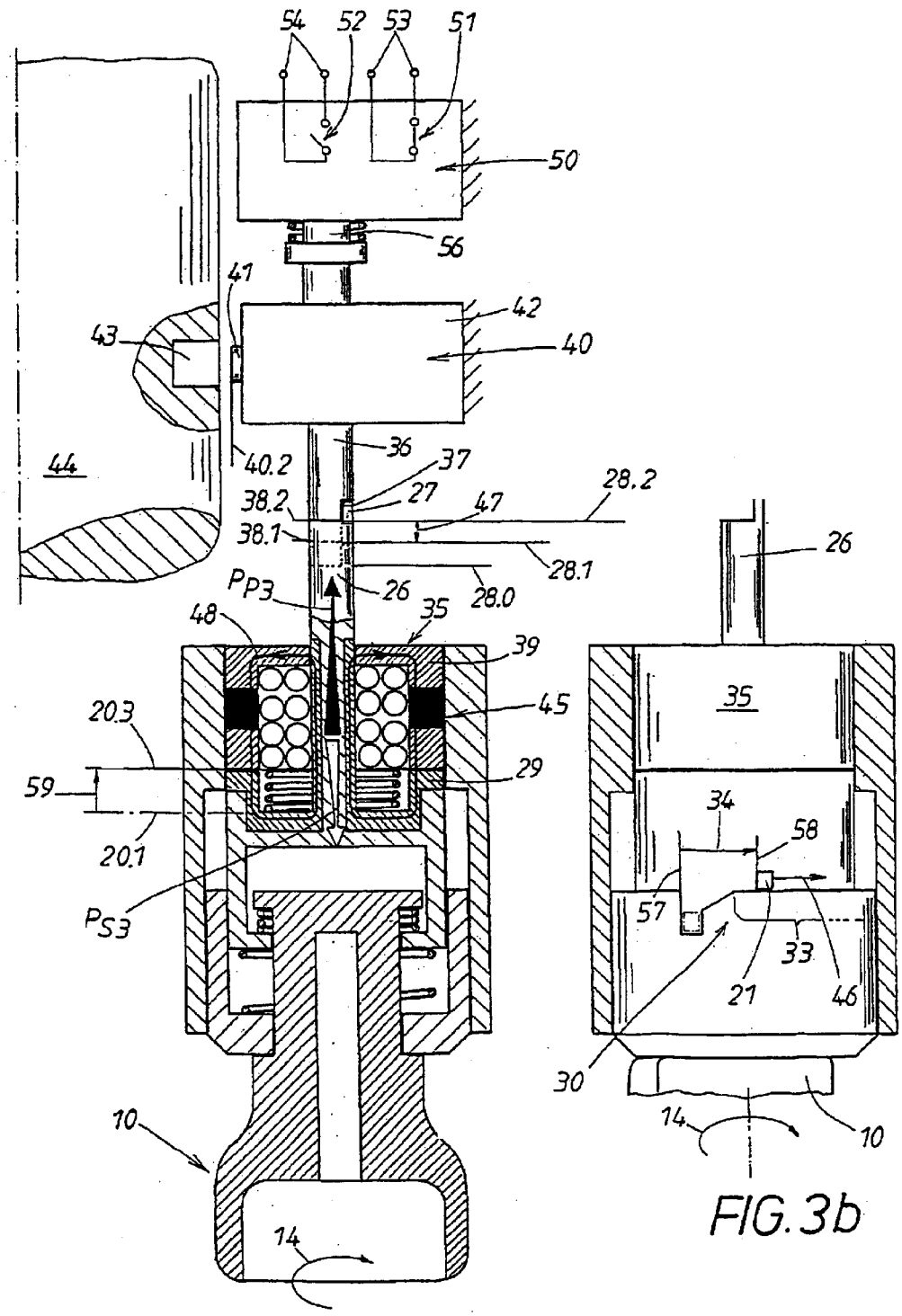
FIGS. 3a and 3b show a second phase of operation, which results from the turning of the handle and which leads to the unlocked position of the steering mechanism and to a first working position of the switch, the possibility of further rotation of the handle still being provided.

In the intermediate position 20.2 of the rotor 20, the output end 27 of the rotor has also moved by a corresponding axial distance into its intermediate axial position, labeled 28.1, which coincides with the previously described axial position 38.1 of the opposing connector end 37. As a result, a rotation-proof connection is established between the connector ends 27, 37 described above. The previously mentioned possibility of rotation in direction 14 means that, when the handle is thus turned, it also acts by way of the rotor on the countershaft 36 and on the selector shaft 36. FIGS. 3a and 3b show an angle of rotation 34, which is sufficient to activate the first component switch 51 of the ignition starter switch 50 via the selector shaft 36. The pin 21 of the rotor 20 has moved from its home position of the switch 50, indicated by the auxiliary line 57, to the first working position of the switch 50, indicated by the additional auxiliary line 58. The associated terminals 53 of the component switch 51 are thus connected and permit the specific functions assigned to them in the vehicle to proceed. In the first working position 58, for example, the radio and the lights in the vehicle can be turned on. In this case, the second switch 52, which is intended for other functions in the vehicle, is still open. After this rotation 34, the rotor pin 21 has reached the horizontal end section 33 of the cam 30, which continues thereafter on the same axial level. Upon further rotation 14 of the handle, therefore, the rotor pin 21 moves on a constant axial level in the direction of the arrow 46 of FIG. 3b, so that all of the other working positions of the switch 50, e.g., the ignition position and finally the engine-starting position, are reached in succession. When it is released, the handle 10 is returned automatically by torsion springs from the third or "engine-starting" working position to the second or "ignition" position.

The previously mentioned initial rotation 34 of the rotor also acts via the countershaft 36 on the actuator 42 of the steering lock 40. The actuator 42 has the job of moving the locking bolt 41 into its unlocked position, indicated by the auxiliary line 40.2, so that the locking opening 43 in the steering column 44 is released. The steering mechanism 44 can now be operated again. This continues to remains so during the further rotation 46 of the rotor 20, as previously mentioned.

In the end position 20.3 of the rotor 20, the connecting means 27, 37 between the shaft 26 and the countershaft 36 are still obviously engaged. The axial stroke 47 between the starting position 20.1 and the end position 20.3 of the rotor 20 obviously results in a corresponding axial stroke 47 between the original axial position 28.0 of the rotor output end 27 of FIG. 1a and the axial position 28.2 of FIG. 3a, which is again on the same level as the axial position 38.2 of the opposing connector 37, which has been shifted by the same amount. After the initial rotation 34 of FIGS. 3a and 3b, the current to the electromagnet can be turned off again, because now a permanent magnet 45 has gone into action.

The permanent magnet 45 is integrated into the previously mentioned magnetizable material 39 of the electromagnet 35. In the end position 20.3, furthermore, the magnetizable material 29 at the inner end of the rotor 20 is in contact with the material 39 of the electromagnet 35. As a result, a closed ring of magnetic flux 48 is created at the permanent magnet 45 as shown in FIG. 3a, which flux holds the rotor 20 in place with a very powerful magnetic force $P_{P3}$. The electromagnet 35 can be turned off by contacts or sensors, which are activated after this initial rotation 34. As an alternative, it would also be possible to define a period of time and to turn the electromagnet 35 off after this time expires.

Figures 4A, 4B:
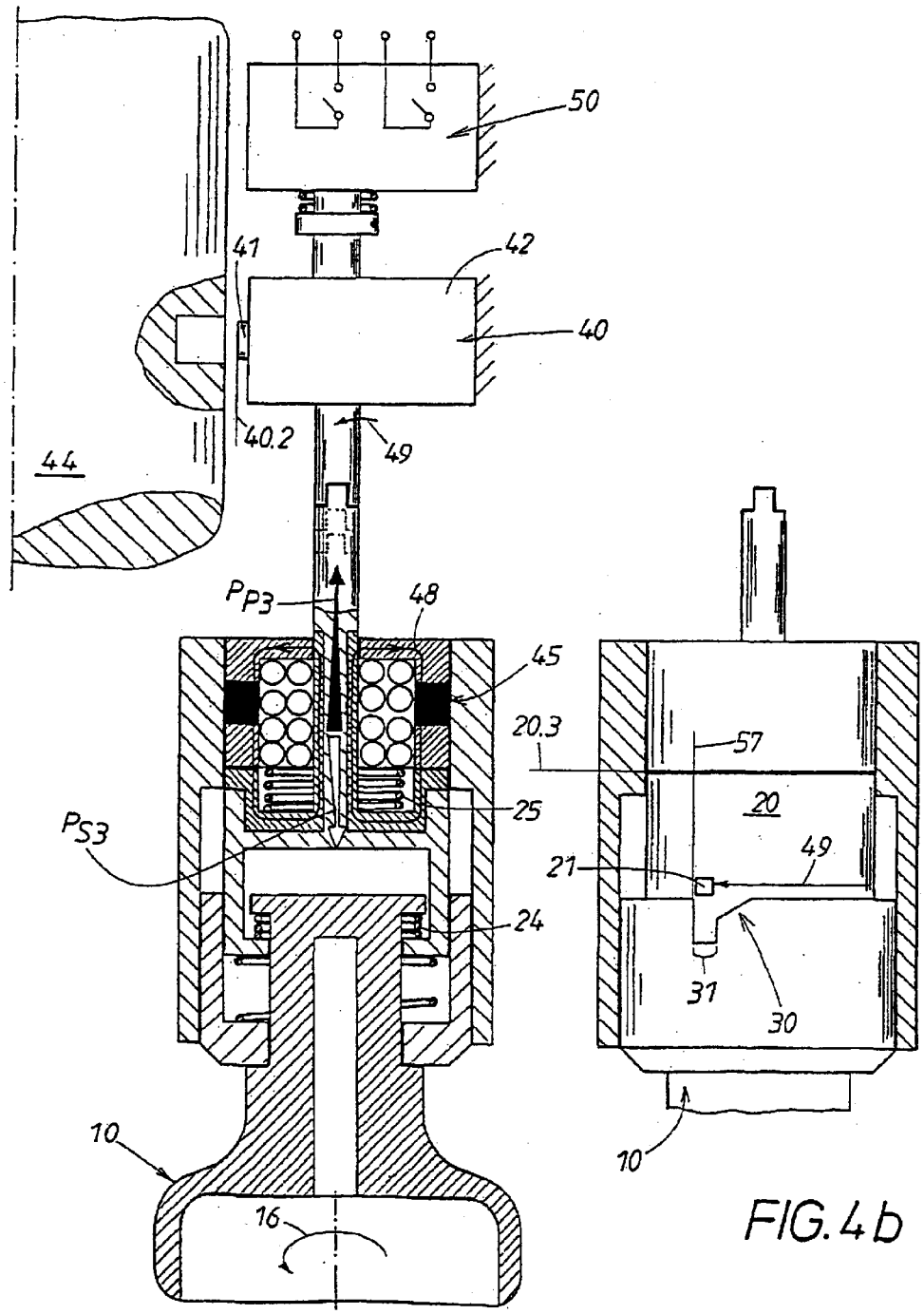
FIGS. 4a and 4b show a third phase of operation, which results when the handle is turned in reverse, back to the home position of the switch, but in which the steering mechanism remains in its unlocked position.

The magnetic force $P_{P3}$ acting in the axial end position 20.3 according to FIG. 3a is much stronger than the additive restoring spring force $P_{S3}$ produced by the restoring springs, also shown in FIG. 3a. For this reason, the end position 20.3 remains preserved even after the handle 10 has been turned back in the direction of the arrow 16 of FIG. 4a. In FIG. 4b, the corresponding reverse rotation of the rotor 20 is indicated by the arrow 49. The rotor pin 21 has again been brought into axial alignment with the starting section 31 of the cam 30. The permanent magnet 45 therefore holds the rotor 20 unchanged in its end position 20.3. For this reason, the pin 21 disengages from the cam 30 during the reverse rotation 49, and the switch 50 returns to the home position 57 of FIG. 1a, indicated in dash-dot line. The compression springs 25, 24 remain squeezed together to a corresponding extent. In the case of FIG. 4a, this does not apply analogously to the steering lock 40. On the contrary, the steering lock 40 remains in the unlocked position 40.2, previously illustrated in FIG. 3a. This is ensured by the actuator 42, which, during this reverse rotation 49, continues to hold the locking bolt 41 in its retracted position. In the operating phase of FIG. 4a, therefore, the steering column 44 still remains steerable. The home position 57 of the pin 21 in FIG. 4b, where it is aligned with the starting section 41 of the cam 30, can be determined by end stops (not shown), which prevent any further rotation of the handle in the reverse direction.

So that the rotor 20 can be moved back from its end position 20.3, it is necessary for a counterforce to be exerted, which exceeds the difference between the magnetic force $P_{P3}$ and the restoring force $P_{S3}$ of the springs. For this purpose, the invention proposes two methods, which can be used as alternatives to each other; the first is explained in FIGS. 5a and 5b, the second in FIGS. 6a and 6b. For the sake of clarity, FIGS. 5a and 5b still show the same position of the components as that of FIGS. 4a and 4b, for which reason the description just given still applies. It is sufficient to discuss only the additional measures which have now been taken.

Figures 5A, 5B:
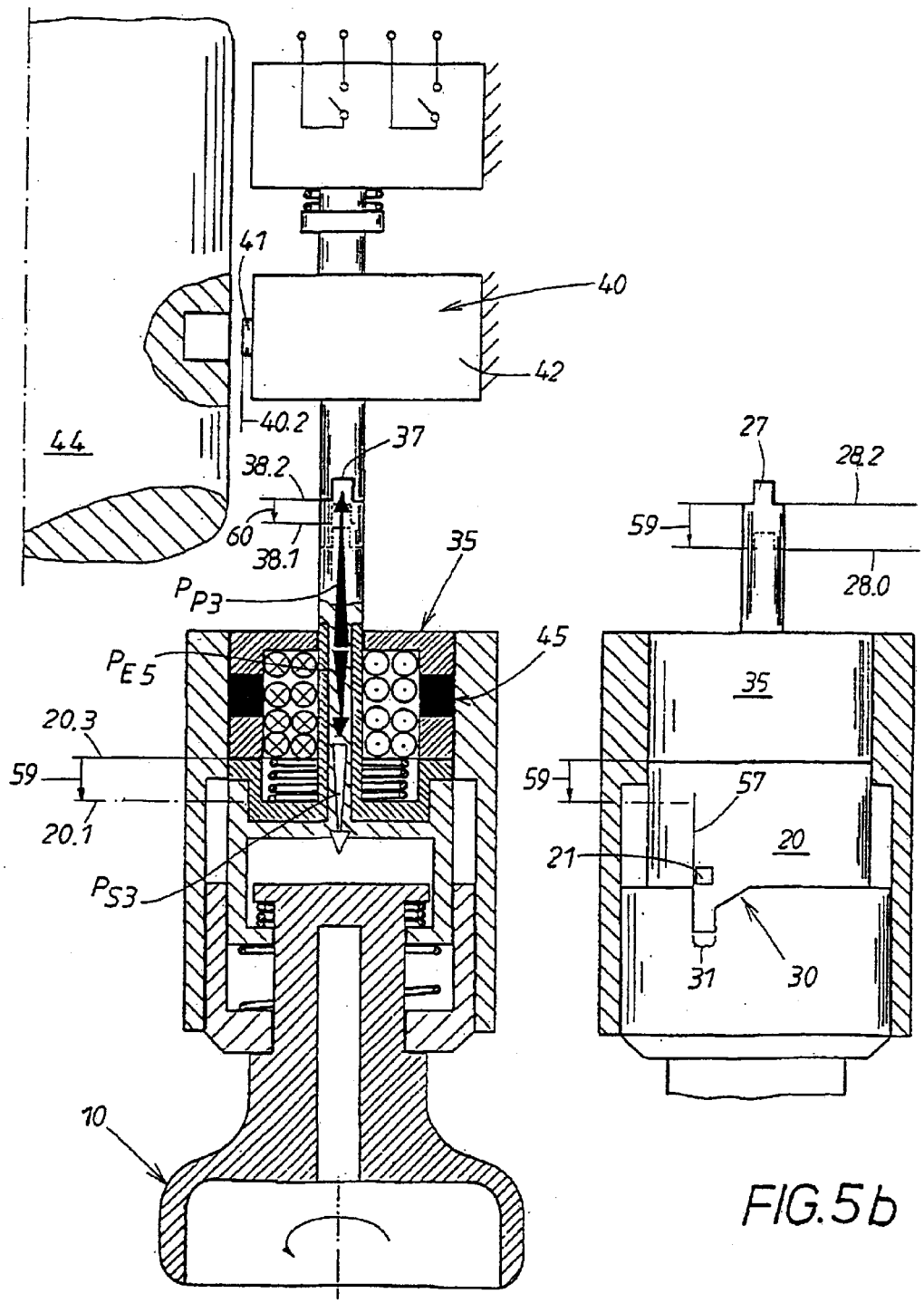

In FIGS. 5a and 5b, these additional measures consist in that flow of current to the electromagnet 35 is reversed in comparison with FIG. 2a. As illustrated by the symbols in the windings of the electromagnet 35 of FIG. 5a, the current now flows in the direction opposite that of FIG. 2a, for which reason the electromagnet 35 now exerts the same magnetic force $P_{E5}$ as before in terms of absolute value, but in the opposite direction. This magnetic counterforce $P_{E5}$ thus acts in opposition to the magnetic force $P_{P3}$ of the permanent magnet 45 and in the same direction as the resulting spring restoring force $P_{S3}$. The total force resulting from $P_{E5}$ and $P_{S3}$ is sufficient to overcome the effect of the permanent magnet 45. The rotor 20 therefore disengages from the permanent magnet 45 and moves back from its end position 20.3 over the indicated axial distance 59 to its starting position 20.1. As a result, the axially aligned pin 21 of the rotor 20 re-enters the groove-like starting section 31 of the cam 30.

This axial movement obviously also has an effect on the previous axial position 28.2 of the rotor output end 27, which thus arrives back in the original axial position 28.0 of FIG. 1a. This axial movement 59 is also performed in part, of course, by the counter-connector 37, which moves back from its most recent axial position 38.2 to the original axial position 38.1 of FIG. 1a. The axial distance 60 thus traveled is indicated in FIG. 5a. This axial movement 60 is detected by the actuator 42 of the steering lock 40, and the actuator moves the locking bolt 41, which is still retracted at this point, into its locking position 40.1 of FIG. 1a. The steering column 44 again becomes locked. Thus the original positions of all the components described in connection with FIGS. 1a and 1b, which characterize the home position of the device, are restored.

Figures 6A, 6B:
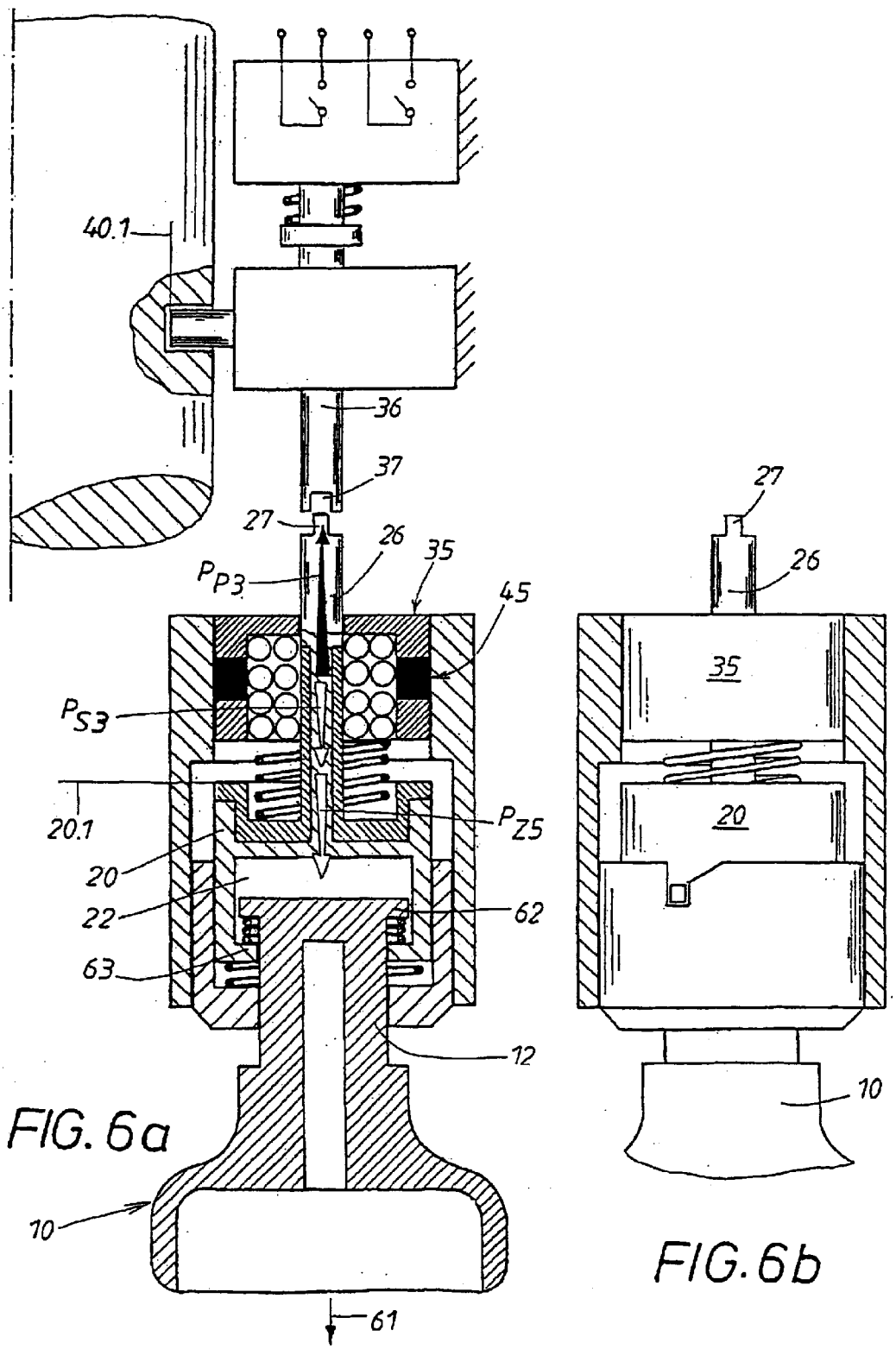
FIGS. 6a and 6b show an alternative to the fourth phase of operation of FIG. 5a, where the conditions have been created for the return to the starting position of FIG. 1a in a different way.

In the alternative of FIGS. 6a and 6b, the required counterforce is produced not electrically but rather by purely mechanical means, namely, by the exertion of a pulling movement on the handle 10, characterized by the arrow 61. FIG. 6a shows the handle 10 while it is still in its pulled-out position, in which the rotor 20 has already returned to its original axial starting position 20.1 and the two connecting means 27, 37 are already disengaged and have assumed the positions shown in FIG. 1a. To illustrate how this works, however, the magnetic force $P_{P3}$ of the permanent magnet 45 and the resultant spring restoring force $P_{S3}$ are shown as they exist before the start of the pulling movement 61 of the handle 10 and to this extent are already known from FIG. 5a. But now a very strong tensile force $P_{Z5}$, which is exerted by the handle 10 on the rotor 20, is added to them. The tensile force $P_{Z5}$ is exerted by way of a head piece 62 on the previously described shaft 12 of the handle and an inner collar 63 on the receptacle 22 of the rotor 20. The previously mentioned compression spring 24 can be supported between these elements 62, 63. Thus the pulling action 61 on the rotor 20 allows the tensile force $P_{Z5}$ to be created.

What is claimed is:

1. Device with a steering lock (40) and with an ignition starter switch,
   where the steering mechanism (40) can be changed from a locking position (40.1) to an unlocking position (40.2) and the switch (50) from a rest position (57) to at least one working position (58) by rotation (14) of an nondetachable handle (10) only
   when an ID receiver in the vehicle determines the presence of an ID transmitter assigned to it and an ID scan is initiated,
   whereas, in the absence of an ID transmitter, the handle (10) cannot be rotated (14; 16) by hand;
   with a restoring spring (23, 24, 25), which acts on control means connected to the handle (10) and which, after actuation of the control means, tries to push them back into a defined axial starting position; and
   with a cam for the axially and rotationally coordinated movement of the control means, wherein the control means comprise a rotor (20), upon which the restoring spring (23, 24, 25) acts, at least certain areas of the rotor (20) consisting of magnetizable material (29), the rotor also being connected to the handle (10) without freedom of rotation but with freedom of axial movement; in that the rotor output end (27) has a rotational connection with the steering lock (40) and also with the ignition starter switch (50); in that when in its starting position (20.1), the rotor (20) interacts with an initial section (31) of the cam (30) and prevents the rotation (14, 16) of the handle (10), but upon a successful ID scan, current is supplied to an electromagnet (35), and the rotor (20) is thus pushed against the force ($P_{S1}$) of the restoring spring (23, 24, 25) into an intermediate axial position (20.2), in which an axially and radially slanted intermediate section (32) of the cam (30) starts to interact with the rotor (20); in that when the handle (10) is turned (14), the rotor (2) is moved by this intermediate section (32) into an axial end position (20.3), in which a permanent magnet (45) holds the rotor (20) in its end position (20.3) against the force ($P_{S3}$) of the restoring spring (23, 24, 25); in that a final section (33) of the cam (30) allows the further rotation (46) of the rotor (20) into the axial end position (20.3), in which the steering mechanism (40) is brought into its unlocking position (40.2) and the switch (50) into its desired working position (58) by the action of the rotor output end (27); in that when in its axial end position (20.3), it is also possible for the rotor (20) to rotate in reverse (49) back to the home position (57) of the switch (50), where, even though the rotor, which is held in position by the permanent magnet (45), disengages from the cam (30), the unlocking position (40.2) of the steering mechanism (40) nevertheless remains preserved; and in that after this reverse rotation (49), the rotor (20) is moved back axially (59) into its starting position (20.1) on the cam (30) by an axial force ($P_{S3}$, $P_{S2}$) opposing the retaining force ($P_{P3}$) of the permanent magnet (45), where the steering mechanism (40) is again brought back into its locking position (40.1) by the action of the rotor output end (27).

2. Device according to claim 1, wherein the handle (10) cannot be pushed inward (17) in any of its positions (20.1, 20.2, 20.3).

3. Device according to claim 1, wherein the current to the electromagnet (35) is turned off after the rotor (20) has reached its end position (20.3).

4. Device according to claim 1, wherein the electromagnet (35) is turned off by a contact or a sensor, which determines the axial end position (20.3) of the rotor (20).

5. Device according to claim 1, wherein the electromagnet (35) is turned off after a certain period of time.

6. Device according to claim 1, wherein the axial counterforce ($P_{E5}$), which acts in the direction of the spring restoring force ($P_{S3}$), is produced by reversing the flow of current to the electromagnet (35).

7. Device according to claim 6, wherein the reversal of the flow of current to the electromagnet (35) is initiated by a fuse associated with the door locks located on the vehicle.

8. Device according to claim 6, wherein the reversal of the flow of current to the electromagnet (35) is initiated by the opening and/or closing of the door after the ID transmitter has been removed.

9. Device according to claim 6, wherein the reversal of the flow of current to the electromagnet (35) is initiated, with the ID transmitter removed, after the expiration of a certain period of time.

10. Device according to claim 1, wherein the axial counterforce on the rotor (20) is reinforced by a tensile force (61) exerted on the handle (10), this tensile force being transmitted to the rotor (20) by way of shoulders (62) and opposing shoulders (63) in the connection (12, 22).

11. Device according to claim 1, wherein the ID scan is initiated by further actuations which can be performed on the vehicle such as the actuation of a switch integrated into the door handle, the actuation of the vehicle brake, or the actuation of the handle (10).

12. Device according to claim 1, wherein an axial connection is provided between the rotor output end (27) and the assembly formed by the steering lock (40) and the ignition starter switch (50), and in that the axial connection (27, 37) is disengaged in the starting position (20.1) of the rotor (20) but is engaged both in the axial intermediate position (20.2) and in the axial end position (20.3) of the rotor (20).

* * * * *

UNITED STATES PATENT AND TRADEMARK OFFICE
CERTIFICATE OF CORRECTION

| | | |
|---|---|---|
| PATENT NO. | : 6,794,768 B2 | Page 1 of 1 |
| APPLICATION NO. | : 10/381244 | |
| DATED | : September 21, 2004 | |
| INVENTOR(S) | : Gianni Uselli | |

It is certified that error appears in the above-identified patent and that said Letters Patent is hereby corrected as shown below:

Title Page should read
[30]        Foreign Application Priority Data

<u>Nov. 8, 2000</u>    (DE)    ………………..10055361

Signed and Sealed this

Fifth Day of September, 2006

JON W. DUDAS
*Director of the United States Patent and Trademark Office*